No. 750,121. PATENTED JAN. 19, 1904.
J. PRADE.
ICE CREAM FREEZER.
APPLICATION FILED MAY 28, 1903.
NO MODEL.
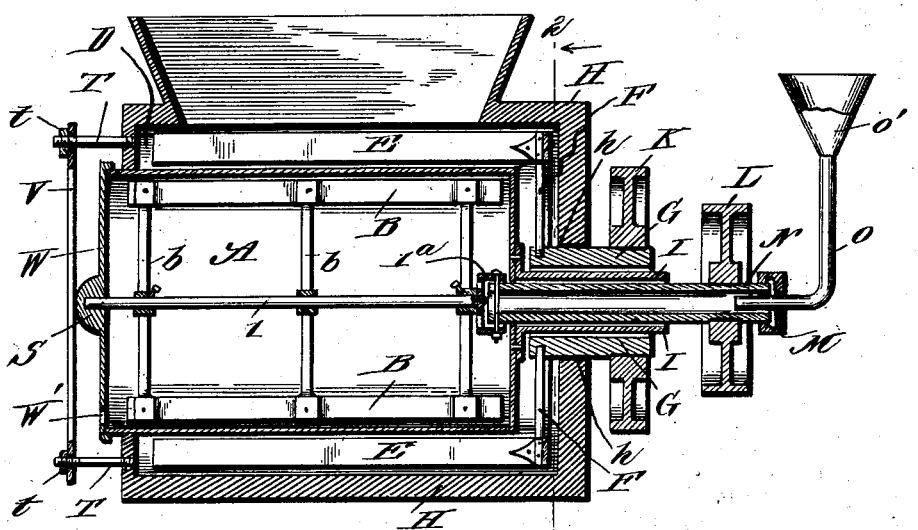
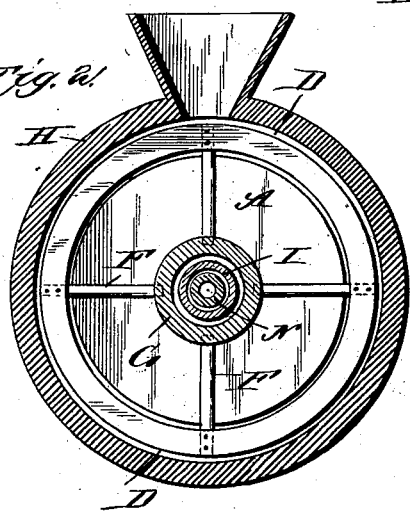
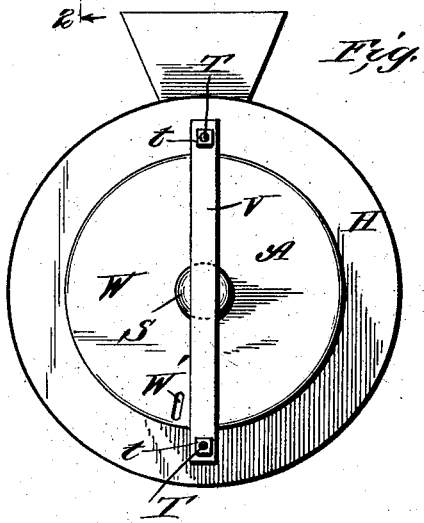
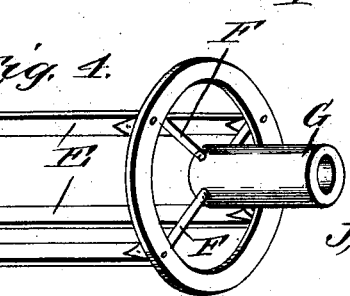
WITNESSES:
INVENTOR
Julian Prade
BY Munn & Co.
ATTORNEYS.

No. 750,121. Patented January 19, 1904.

UNITED STATES PATENT OFFICE.

JULIEN PRADE, OF WACO, TEXAS.

ICE-CREAM FREEZER.

SPECIFICATION forming part of Letters Patent No. 750,121, dated January 19, 1904.

Application filed May 28, 1903. Serial No. 159,100. (No model.)

*To all whom it may concern:*

Be it known that I, JULIEN PRADE, residing at Waco, in the county of McLennan and State of Texas, have invented a new and Improved Ice-Cream Freezer, of which the following is a specification.

My invention seeks to provide certain new and useful improvements in that class of ice-cream freezers adapted for the use of ice, sea-salt, nitrate of ammonia, and other like refrigerants; and it comprehends generally a peculiar coöperative arrangement of an insulated jacket or casing, a cream-holding cylinder endwise movable into the said casing joined with a feed member for feeding the liquids to be frozen into the cylinder, a rotary dasher operable within the cylinder for agitating the material being frozen, and a second rotary dasher device operable between the cylinder and the casing for constantly keeping in agitation the refrigerating mixture.

In its more subordinate features my invention consists in certain details of construction and peculiar combination of parts, all of which will hereinafter be described, and specifically pointed out in the appended claims, reference being had to the accompanying drawings, in which—

Figure 1 is a vertical longitudinal section of my improved ice-cream freezer. Fig. 2 is a transverse section thereof taken practically on the line 2 2 of Fig. 1 looking in the direction of the arrow. Fig. 3 is an end view of the same, and Fig. 4 is a detail perspective view of the refrigerant stirrer-blades and their supporting end rings.

In the practical construction of my invention the same comprises a stationary outer casing or jacket H, which may be of the usual insulated kind, supported upon a base or any other means for firmly attaching or supporting the same at any suitable point. One end of the casing H has a large circular opening to permit of readily inserting therethrough the cylinder A for containing the liquid or other material to be frozen. The cylinder A has its outer end open and when the parts are in an operative condition the said end is closed by a cap W, provided with a convexed central bearing-piece S, adapted to receive one end of a longitudinal shaft 1, on the opposite end of which is a spider-hub or cuff member $1^a$, which connects with the tubular axially-mounted hollow journal-shaft end which projects through the closed end of the outer jacket or casing H, through which the liquid or other material to be frozen is fed into the cylinder A, as clearly shown in Fig. 1 and presently more fully explained. The end cap or closure member W is firmly held on the open end of the cylinder A and the said cylinder is properly supported within the casing H by means of a presser plate or slat V, which bears against the part S on the end cap W and whose opposite ends engage stud-bolts T, that project from the open end of the casing H, and the said slat or member V is held pressed against the member S by the adjusting-nuts $t$, mounted on the stud-bolts, as shown.

The shaft 1 within the cylinder A carries a number of radial arms $b$, to the outer ends of which connect the longitudinal dasher-blades B, which move in close proximity to the inner face of the cylinder A.

To the inner end of the cylinder A is fixedly secured a tubular hub or stem I, that extends over the hollow feed tube or journal N, and the said hub I is mounted within a short hollow rotary hub G, journaled in the axial opening $h$ of the outer casing H.

To the inner end of the hub G is connected a series of radial arms F, to the outer ends of which (see Fig. 4) are secured a series of longitudinally-projecting blades E E, that move in the space D between the jacket H and the cylinder A, within which space is held a refrigerant—ice, brine, or other freezing agent—which is conveniently fed into the space D through the hopper or other opening in the top of the casing H. The outer end of the hub G carries a drive-pulley or gear K, and the hollow shaft N has a drive gear or pulley L, and the said hollow shaft is extended beyond the gear L and carries a gland or stuffing-box M, through which passes the feed-pipe O, connected to a funnel O', into which is received the liquid to be frozen and which passes constantly from the said funnel O' into the cylinder A, in which it is continuously frozen and from which it passes in its frozen state through a discharge-outlet W' in the cylinder end W.

From the foregoing description, taken in connection with the accompanying drawings, it is believed the manner of operation and the advantages of my invention will be readily understood. The ice or other refrigerant is entered into the space D between the cylinder and the jacket after the said cylinder has been fitted in place. Power is then applied to the gears or pulleys K and L in any approved manner to impart motion to the dasher-blade B and the refrigerant stirrer-blades. The blades B revolving in the cylinder constantly agitate the material that enters through the tubular journal end and force it to the outlet W'. At the same time that the blades B act on the contents in the cylinder A the blades E agitate and constantly stir the refrigerant held in the same to circulate within the said studs in a thorough and efficient manner.

By arranging the several parts as shown and described it is apparent the same can be economically constructed and readily assembled.

One of the main advantages of my construction of freezer is that by simply taking off the bolts $t$ $t$ to permit the removal of the cross slat or member V the cylinder A, together with the dasher or stirrer devices mounted therein, can be readily removed without disconnecting any of the parts at the closed end of the casing H further than to disconnect the cuff member on the shaft 1 from the inner end of the tubular journal N.

Having thus described my invention, what I claim, and desire to secure by Letters Patent, is—

1. The combination with the outer casing open at one end and having an axial aperture in the other end, a hollow hub journaled on the said axial aperture provided with a drive-gear on its outer end, a series of radial arms connected with the inner end of the said hollow hub, and a series of longitudinally-extended dasher-blades connected to the outer ends of the said radial arms; of a cylinder endwise insertible through the open end of the casing between the aforesaid dasher-blades, said cylinder having a hollow journal adapted to project through the hollow hub mounted in the casing, a feed-tube projected through the said hollow journal to discharge into the hollow outer end of the cylinder, being removable, a discharge-blade-equipped shaft journaled at one end in the removable end of the cylinder and having means for detachably connecting with the inner end of the hollow feed-journal to rotate therewith, said journal having a drive-pulley on its outer end, means mounted on the casing for holding the removable end of the cylinder in the closed position, a means for feeding the refrigerant into the casing and a separate means for feeding the material to be frozen into the hollow feed-journal, all being arranged as shown and described.

2. An ice-cream freezer of the character described, comprising an outer casing having a large opening at one end and a smaller axial opening at the other end, a cylinder endwise insertible through the large opening in the casing, said cylinder including a removable end or cap portion, the latter having a central bearing and an outlet for the frozen material, stud-bolts projected from the casing end, the slat or cross-plate detachably mounted on the said bolts and adapted to bear against the detachable cover end of the cylinder, a hollow hub journaled in the small axial opening on the casing, rotary arms connected to the inner end of the said hub, longitudinal blades operable between the casing and the cylinder connected to the said rotary arm, a hollow journal on the front end of the cylinder mounted in the hollow hub, a feed-tube extended through the hollow journal into the cylinder, said feed-tube having a drive-pulley at its outer end, a dasher rotatably mounted within the cylinder connected with and driven by the rotatable feed-tube, as specified.

3. In an ice-cream freezer of the character described, the combination of a stationary outer casing, a cylinder stationarily held therein, a means for feeding a refrigerant into the space between the cylinder and the casing; a hub rotatably mounted in one end of the casing, a series of radial arms connected to the inner end thereof, stirrer-blades movable in the space between the casing and the cylinder connected to the said arms, said hub having a drive-gear on its outer end and a hollow feed-tube rotatably mounted within the aforesaid hub carrying a drive-gear at its outer end and having its inner end extended into the cylinder, a dasher rotatable within the cylinder connected to the inner end of the feed-tube and rotatable therewith, a means for feeding the material to be frozen into the outer end of the feed-tube, all being arranged substantially as shown and described.

JULIEN PRADE.

Witnesses:
B. E. CLEMENT,
E. M. EWING.